Mar. 3, 1925.
B. W. MILLER
1,528,222
COMBINATION POWER SHOVEL AND DITCHER
Original Filed Nov. 13, 1922    4 Sheets-Sheet 1
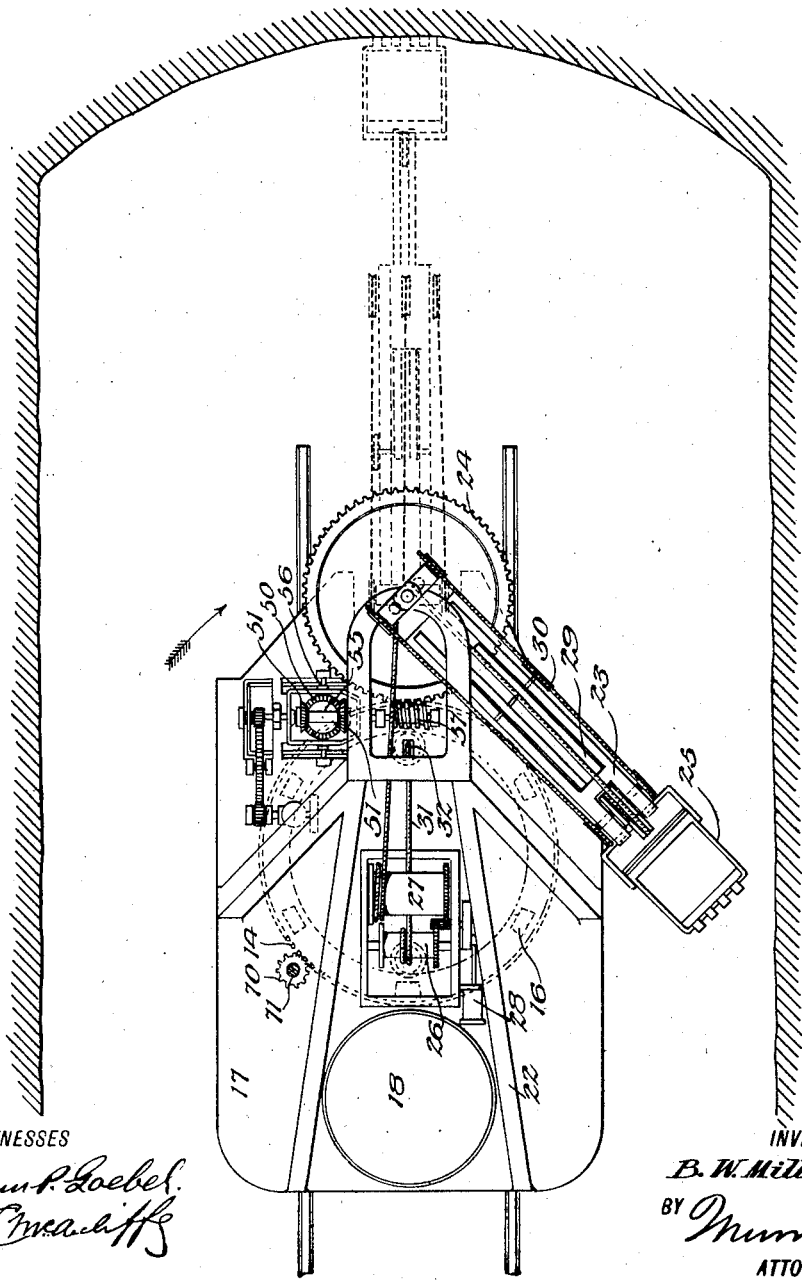

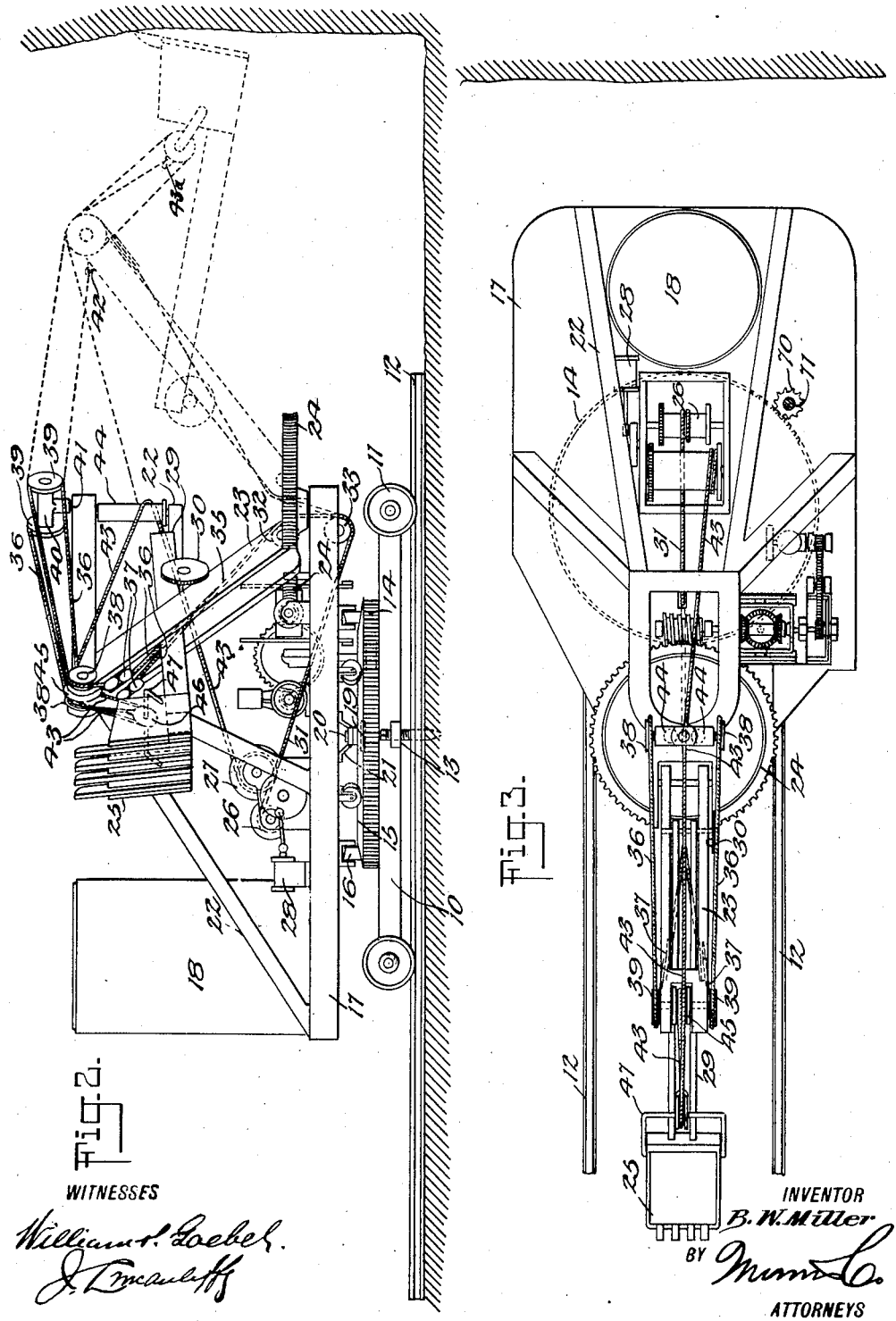

Mar. 3, 1925.

B. W. MILLER 1,528,222

COMBINATION POWER SHOVEL AND DITCHER

Original Filed Nov. 13, 1922    4 Sheets-Sheet 3

WITNESSES

INVENTOR
B. W. Miller
BY
ATTORNEYS

Mar. 3, 1925.
B. W. MILLER
1,528,222
COMBINATION POWER SHOVEL AND DITCHER
Original Filed Nov. 13, 1922   4 Sheets-Sheet 4
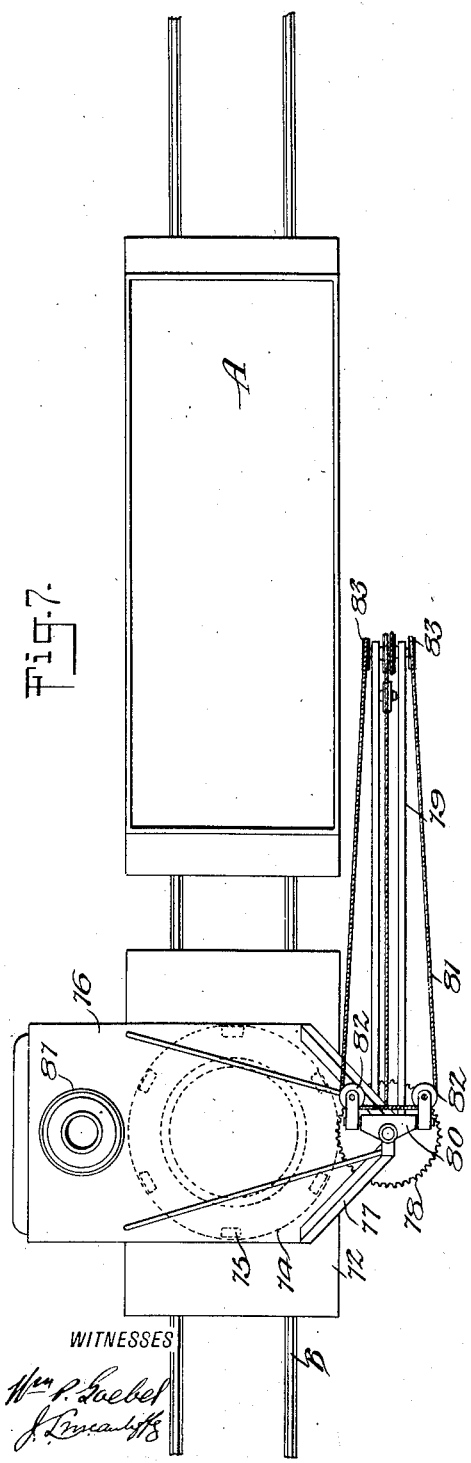
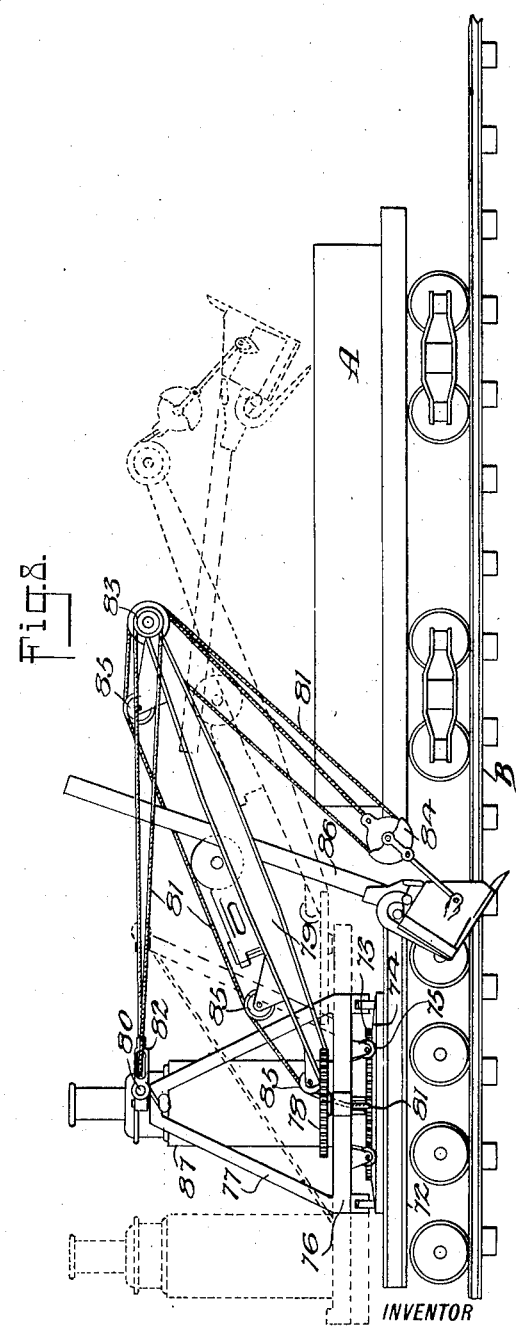
INVENTOR
B. W. Miller
BY
ATTORNEYS Patented Mar. 3, 1925.

1,528,222

UNITED STATES PATENT OFFICE.

BYRON WOOTEN MILLER, OF DENVER, COLORADO.

COMBINATION POWER SHOVEL AND DITCHER.

Application filed November 13, 1922, Serial No. 600,721. Renewed May 29, 1924.

*To all whom it may concern:*

Be it known that I, BYRON W. MILLER, a citizen of the United States of America, and a resident of Denver, in the county of Denver and State of Colorado, have invented a new and Improved Combination Power Shovel and Ditcher, of which the following is a description.

My invention relates to a shovel mounted on a car and actuated by steam or compressed air as a motive fluid and adapted to be arranged for use either in mines, in tunnels or in ditching at the side of the machine.

The general object of my invention is to provide an assemblage involving a platform or cab and a derrick, the boom of which carries the shovel and is adapted to be revolved with the cab and relatively to the car or to revolve relatively to the cab, whereby in operation, the boom, cab and car may assume different positions relatively to one another that they may act independently of or simultaneously with one another and thus the cab can be set at any position relatively to the car and the boom and shovel work from that position or the shovel after an operation thereof can fold with the boom to the cab and then all revolve on the car and again unfold and dump after which the reverse actions may be brought into play, the arrangements resulting that the entire machine can operate in a restricted space and likewise the position and location of the boom can be so arranged that the shovel can act in any direction with regard to the car, that is, in the front or rear or at the side of and parallel with the car. The mechanism allows movements or actions of the respective elements to be independent of one another or allows actions in either direction to be conducted in unison or interactions in either direction to be conducted in unison or intermittently with the other actions.

The nature of the invention and its distinguishing features and advantages will clearly appear as the description proceeds.

Reference is to be had to the accompanying drawings it being understood that the drawings are merely illustrative of practical examples of the invention.

Figure 1 is a plan view of a shovel and ditcher embodying my invention;

Figure 2 is a side elevation thereof showing in full lines the boom and shovel in the position of Figure 1 oblique to the side of the car and showing in dotted lines the straight-ahead position as in tunneling;

Figure 3 is a plan view with the boom and shovel swung reversely to the dotted line position of Figures 1 and 2, that is to say, in the opposite direction from the tunnel facing for dumping in the rear of the machine;

Figure 7 is a plan view of the machine rigged for ditching at a side of a track for example;

Figure 8 is a side elevation of the assemblage of Figure 7.

Figure 4:
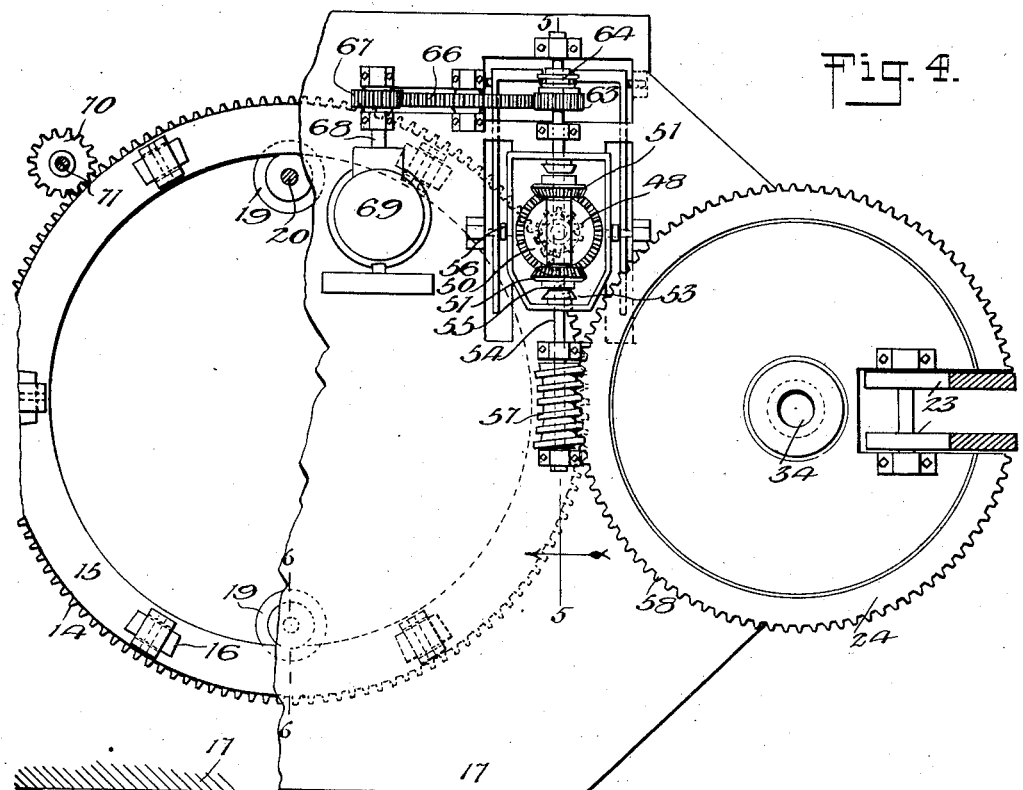
Figure 4 is an enlarged fragmentary sectional plan view given to show one means for so arranging the revolving cab and the boom turntable that the turntable may be driven by and with the turning of the cab or either be revolved independently.
Figure 6:
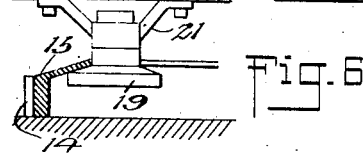
Figure 6 is a detail in vertical section on the line 6—6, Figure 4.
Figure 5:
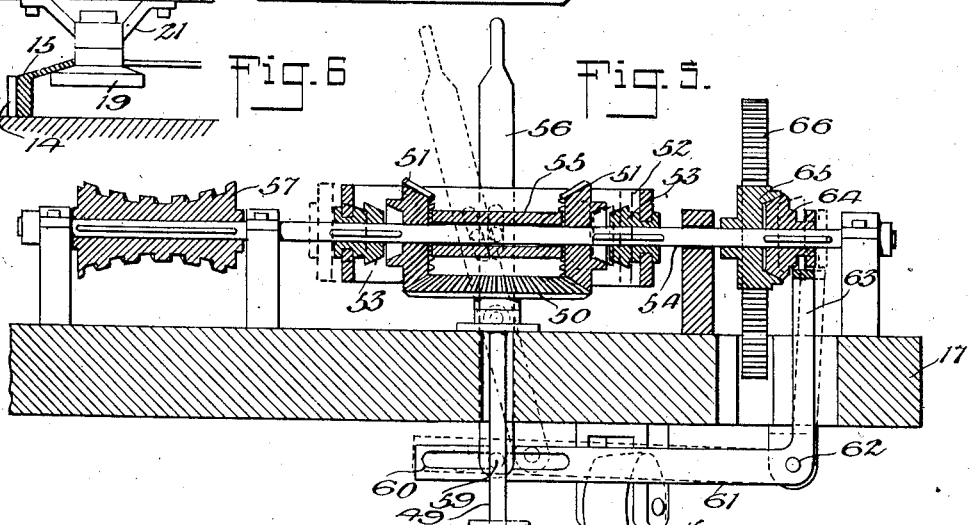
Figure 5 is a vertical section as indicated by the line 5—5, Figure 4.

Referring at first more particularly to Figures 1 to 6 a car 10 is provided having wheels 11 to run on track rails 12 as in a tunnel or mine; 13 indicates a stud having a nut thereon and adapted to be screwed or driven into the trackway to constitute a stop limiting the forward or backward movement of the car 10.

On the car 10 is a fixed annular rack or swing gear 14, the upper surface of which constitutes a circular track 15 on which run bevel wheels 16 on the under side of the platform or cab 17, said structure 17 usually being designated a cab in that it is ordinarily covered to house the machinery. Any means to furnish a motive fluid for the operation of the drums and gearing may be provided. I have conventionally indicated a compressed air tank 18 in the assemblage of Figures 1 to 6. The cab or platform 17 hereinafter referred to as a cab in accordance with the terminology of the trade is provided at the under side with guard rollers 19 diametrically opposite and turning on vertical studs or axles 20 in brackets 21 on the cab.

On the cab 17 is a derrick structure designated generally by the numeral 22. The derrick boom 23 is mounted on a turntable 24 turning on the platform 17 at the front, said boom carrying the known type of shovel 25. The boom cables hereinafter referred to are controlled by a drum 26 and the shovel cables by a drum 27. Said drums may be driven in any approved manner. I have conventionally indicated an engine 28 for the drum 27, the drive for the drums not forming part of my present invention. The shank or beam 29 of the shovel 25 has associated therewith a crowding wheel 30 functioning in a known manner and not needing description here.

The cable rigging for the boom 23 is as follows:

The cable 31 runs from the drum 26 through the bottom of the platform of the cab to the under side and about a sheave 33, thence upwardly through a hole 34 formed centrally in turntable 24, said cable passing between the spaced sides of the boom 23 and branching from a point indicated at 35, the branches passing to sets of tackle 37. From the tackle 37 the branches 36 pass upwardly over sheaves 38 on the top of the boom and then rearwardly or at the back of the boom to and about sheaves 39 on a head 40 swivelled as at 41 on derrick frame 22 approximately in vertical alinement with the central hole 34 of the turntable 24. From the sheaves 39 the cable branches 36 return to the boom adjacent the sheaves 38 and are made fast to said boom, the point of fastening being indicated at 42 in the dotted line position of the boom in Figure 2.

The shovel 25 is controlled by a cable 43 which runs from the drum 27 obliquely upward between vertical rollers 44 and thence upwardly to a central sheave 45 and from the latter downwardly to a sheave 46 on the bail 47 of the shovel 25, said cable 43 returning from the bail sheave 46 to a point at the top of the boom 23 where said cable is made fast as at 43ª, Figure 2.

I have illustrated one practical means for revolving the turntable 24 by and with the turning of the cab 17 or for revolving either independently of the other, said mechanism being best illustrated in Figures 7 and 8 in which it will be observed that a pinion 48 is in mesh with rack or swing gear 14. Said pinion 48 is on a vertical shaft 49 extending through the floor of the cab 17 and provided at the upper end with a bevel pinion 50 meshing with bevel pinions 51 on shaft 54 at opposite sides of the pinion 50. A clutch yoke 52 carries clutches 53 at the opposite ends adapted to engage respectively with clutch elements integral with the pinions 51. The clutches 53 and yoke 52 are slidable on shaft 54 mounting the pinions 51. A sleeve 55 on shaft 54 spaces the pinions 51. The clutches 53 are in neutral position in Figure 5 and in clutch with neither pinion 51. The yoke 52 is adapted to be shifted by a lever 56. On shaft 54 is a worm 57 meshing with annular worm teeth on the turntable 24.

For causing the cab 17 to revolve on the car 10 and relatively to the fixed rack 14 on said car, a pinion 70 is shown on a vertical shaft 71 which may be operated by any suitable means (not shown). By the above gearing when the pinion 70 is turned said pinion will travel about the rack or swing gear 14, thereby causing the cab to turn on the car 10. In the revolving of the cab the pinion 48 being in mesh with the fixed gear 14, said pinion will be revolved and through the shaft 49 will revolve the pinion 50 and thereby revolve the pinions 51. Whichever pinion 51 is clutched by a shifting of the yoke 52 and clutch elements 53 will be caused to revolve with the pinion 50 and will thereby turn the shaft 54 in one direction or the other according to which pinion 51 is in clutch. With the driving of the shaft 54 as referred to by the pinion 50 the worm 57 will turn and said worm will in turn revolve the turntable 24, thereby swinging the boom 23 through the desired arc from the forward dotted line position in Figure 1 for example to or from the oblique side position in full lines in Figure 1 or to or from the full-line position shown in Figure 3 disposed rearwardly or in the opposite direction from the forward dotted line position of Figure 1.

By the use of the worm gear 52 for actuating the turntable it provides a control and does not allow the turntable to swing unless actuated through said worm gear so that the described gearing provides an efficient brake for the movement of the turntable although it is obvious that other brake means can be used to control the turntable.

Conditions arise where it is desirable to revolve the turntables 24 when the cab 17 is not revolving and to provide for the independent revolving of turntable 24 and cab 17 the following arrangement is provided:

The lever 56 below its fulcrum has a pin 59 operating in a longitudinal slot 60 in one arm of a bellcrank lever 61 fulcrumed as at 62 on the cab 17 at the under side, the other arm 63 of said bellcrank 61 extending upwardly through the cab flooring and constituting a clutch lever for throwing a clutch 64 into or out of engagement with a clutch element integral with a pinion 65 on shaft 54, said pinion 65 meshing with a gear wheel 66 which in turn is in mesh with a pinion 67 on the shaft 68 of the reversing engine conventionally indicated at 69. When the lever 56 is brought to its neutral position as shown in full lines in Figure 5 the lever pin 59 is at the crest of its arcuate path of movement and as said pin engages in the slot 60 or clutch lever 61 the movement of said lever throws the secondary sliding clutch 64 into engagement with the clutch gear 65 and thereby the shaft 64 will be turned by the engine 69 and through the worm 57 will revolve the turntable 24. In the meantime when the pinions 51 are in neutral position the cab 17 may be revolved by the pinion 70 provided for the purpose in the present example and in this case the turning of the pinion 48 and bevel pinion 50 will idly turn the pinions 51. It will thus be apparent that a mechanism is provided whereby the cab movement can be transferred automatically for actuating the boom and shovel simultaneously and this movement can be controlled at the will of the operator. Or, the cab can be revolved about its axis and the turntable can likewise be turned independently of the movement of the cab for swinging the boom and these movements can be controlled to be synchronized or not as desired.

It is to be noted that the boom cable 31 in passing through the central hole in the turntable 24 is disposed substantially at the axis upon which the swivel yoke 41 revolves and that the revolving of the turntable only twists the said boom cable between the sheave 33 and the boom sheave 32 adjacent the turntable which is done without undue movement of the cable so that as the turntable revolves, the boom remains in substantially the same position until actuated through the movement of the boom drum 26. Similarly, the hoist cable 43 in passing between the equalizing sheaves 16 coordinates said cable and shovel 25 with the turning movement of the boom 23, the rigging of the cable 43 accommodating itself to the turning of the boom. The assemblage provides for the boom and shovel being folded against the cab for turning the cab about its axis so that the shovel and boom clear the tunnel walls after which the boom and shovel may be again extended for dumping, the reverse movements taking place in returning the shovel and boom to the forward working position.

In Figures 7 and 8 the same cab and turntable are employed the drive means being omitted since it is the same as previously described. The said Figures 7 and 8 illustrate the arrangement for ditching alongside of a track B and loading the shoveled matter into a car A. The ditcher assemblage includes a car 72 adapted to travel on the tracks B, said car having a fixed rack 73 corresponding essentially with the fixed rack 14 and affording an annular track 74 for the wheels 75 of the car 76 mounting the derrick frame 77 and having the turntable 78 corresponding with the turntable 24. The boom 79 and shovel 86 are arranged in accordance with a known ditcher assemblage. The rigging of the cable is generally in accordance with known practice. I provide, however, a swivel 80 on top of derrick 77 having sheaves 82 about which cable 81 runs to the sheaves 83 at opposite sides of the head of the boom and downwardly through the block 84 on the bail of the shovel 86. Said cable 81 extends from the mast head downwardly over sheaves 81 centrally through the turntable 78 as in the first-described construction to the under side of the cab where it runs to the described drum 26 omitted from Figures 7 and 8. The numeral 87 indicates a steam boiler for furnishing the motive fluid for the operation of the derrick instead of the compressed air tank 18.

As seen clearly in Figure 7 the independent turning of the cab 76 and turntable 78 enables the cab to be disposed normal to the medial line of the car 72 and with the turntable 78 disposed at a side of the car so that the boom 79 can be disposed parallel with the track which is not possible in ditchers where the boom is in fixed position on the cab which results in the shovel being cramped in position so that its stroke is made at an angle and out from the center line of the main track whereby the shovel digs much more material in its upward swing than is desired in straight ditching. With the cab turned transversely normal to the car the shovel is allowed to dig directly below the turntable and with the stroke of the shovel parallel with the medial line of the track instead of at an angle thereto so that no undesired excavation is made in the banks adjacent to the excavation.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. An apparatus of the class described including a car, a structure turnable about its own vertical axis on said car, a turntable mounted on said structure, a boom and shovel assemblage carried by said turntable to partake of the movements thereof, and means operable to optionally turn said structure and turn said turntable or to simultaneously turn the turntable about its own axis with the turning of said structure.

2. An apparatus of the class described including a car, a structure turnable about its own vertical axis on said car, a turntable mounted on said structure, a boom and shovel assemblage carried by said turntable to partake of the movements thereof, and actuating means optionally variable to cause said structure and said turntable to respond jointly and in unison to said actuating means and turn about their own axes, and means to vary said actuating means to cause independent turning of said structure and said turntable.

3. An apparatus of the class described including a car, a structure turnable about its own vertical axis on said car, a turntable mounted on said structure, a boom and shovel assemblage carried by said turntable to partake of the movements thereof, means to revolve said turntable about its own axis by and with the turning of said structure, and means to optionally bring the first-mentioned means into action.

4. An apparatus of the class described including a car adapted to travel, a structure mounted to turn about its own axis on the car, and a boom and shovel assemblage carried by said structure to partake of the turning movements thereof and mounted to turn about its own vertical axis on said structure, and operating means optionally variable to turn said turntable about its own axis when turning about the axis of said structure or to merely turn about the axis of said structure.

5. An apparatus of the class described including a car, a structure mounted to turn about its own axis on said car, and a derrick carried by said structure to partake of the turning movements thereof, said structure including a vertically swingable boom and shovel assemblage turnable as such on said structure about a vertical axis; together with sheaves on the derrick approximately in a vertical plane with the axis of said assemblage, the rigging of said assemblage including control cables having runs between the boom and said sheaves to limit distortion of the cables to a local twisting action in the region of said axis when said assemblage is turned.

6. An apparatus of the class described including a car, a structure turnable about its own vertical axis on said car, a turntable mounted on said structure, a boom and shovel assemblage carried by said turntable to partake of the movements thereof, driven means to revolve said turntable about its own axis, means to actuate said driven means by the turning of said structure, and means optionally controllable to actuate said driven means independently of the turning of said structure.

7. An apparatus of the class described including a structure mounted to turn about its own vertical axis, a turntable on said structure adapted to revolve independently of the turning of the structure or with the turning of said structure, and a vertically swingable boom and shovel assemblage mounted on said turntable to partake of the movements thereof, the rigging of said assemblage including a boom-control cable passing through the turntable approximately at the axis thereof to limit distortion of the cable to a local twisting adjacent the axis of the turntable with the revolving of the turntable.

8. An apparatus of the class described including a structure mounted to turn about its own vertical axis, a derrick mounted on said structure to partake of the movements thereof, a vertically swingable boom and shovel assemblage mounted to turn on said structure about a vertical axis and independently of the axis of said structure, the rigging of said assemblage including a boom-control cable passing through the turntable approximately at the axis thereof, and sheaves on the derrick above the turntable and approximately in vertical alinement with the axis of said turntable, said control cable running between said sheaves and boom.

9. An apparatus of the class described including a structure mounted to turn about its own vertical axis, a derrick mounted on said structure to partake of the movements thereof, a vertically swingable boom and shovel assemblage mounted to turn on said structure about a vertical axis and independently of the axis of said structure, the rigging of said assemblage including a boom-control cable passing through the turntable approximately at the axis thereof, and sheaves on the derrick above the turntable and approximately in vertical alinement with the axis of said turntable, said control cable running between said sheaves and boom, a shovel control cable having runs from the shovel over the boom toward the vertical plane of said sheaves, and turnable means adjacent the plane of said sheaves about which said shovel control cable runs.

10. An apparatus of the class described including a structure mounted to turn about its own vertical axis, a derrick mounted on said structure to partake of the movements thereof, a vertically swingable boom and shovel assemblage mounted to turn on said structure about a vertical axis and independently of the axis of said structure, the rigging of said assemblage including a boom-control cable passing through the turntable approximately at the axis thereof, and sheaves on the derrick above the turntable and approximately in vertical alinement with the axis of said turntable, said control cable running between said sheaves and boom, a shovel control cable having means from the shovel and over the boom toward the vertical plane of said sheaves, and a pair of vertical rollers on the derrick adjacent the plane of said sheaves between which rollers said shovel-control cable runs.

11. An apparatus of the class described including a structure mounted to turn about its own vertical axis, a derrick mounted on said structure to partake of the movements thereon, a vertically swingable boom and shovel assemblage mounted to turn on said structure about a vertical axis and independently of the axis of said structure, the rigging of said assemblage including a boom-control cable passing through the turntable approximately at the axis thereof, sheaves swivelled on the derrick approximately co-axial with the turntable, said control cable running between said sheaves and the boom.

12. An apparatus of the class described including a structure mounted to turn about its own vertical axis, a derrick mounted on said structure to partake of the movements thereon, a vertically swingable boom and shovel assemblage mounted to turn on said structure about a vertical axis and independently of the axis of said structure, the rigging of said assemblage including a boom-control cable passing through the turntable approximately at the axis thereof, sheaves swivelled on the derrick approximately coaxial with the turntable, said control cable running between said sheaves and the boom; together with a shovel control cable having runs from the shovel over the boom toward the vertical plane of said sheaves, and turnable means adjacent the plane of said sheaves about which said shovel control cable runs.

13. An apparatus of the class described including a car, a structure thereon turnable about its own vertical axis, a derrick mounted on said structure to partake of the movements thereof, a vertically swingable boom and shovel assemblage carried by said structure to partake of the movements thereof and turnable about its own vertical axis independently to dispose the boom in various angular positions relatively to said structure.

14. An apparatus of the class described including a car, a structure thereon turnable about its own vertical axis, a derrick mounted on said structure to partake of the movements thereof, a boom and shovel assemblage carried by said structure to partake of the movements thereof and independently turnable about its own vertical axis, said boom and shovel assemblage vertically swingable to a position permitting the turning of the same about its own axis and through a complete revolution independently of said structure and rigging to raise or lower the boom and to operate the shovel, said rigging being operable to control the boom and shovel irrespective of the relative positions of the said structure and said boom and said shovel assemblage.

BYRON WOOTEN MILLER.